United States Patent [19]

Kalbassi et al.

[11] Patent Number: 5,614,000
[45] Date of Patent: Mar. 25, 1997

[54] PURIFICATION OF GASES USING SOLID ADSORBENTS

[75] Inventors: Mohammed A. Kalbassi, Surrey, England; Timothy C. Golden, Allentown, Pa.

[73] Assignee: Air Products and Chemicals, Inc., Allentown, Pa.

[21] Appl. No.: 538,881

[22] Filed: Oct. 4, 1995

[51] Int. Cl.⁶ .................... B01D 53/04; B01D 53/047
[52] U.S. Cl. .................. 95/96; 95/106; 95/115; 95/121; 95/139
[58] Field of Search .............. 95/95–106, 117–126, 95/139; 96/108, 109, 115, 126–128, 130–133, 143–146

[56] References Cited

U.S. PATENT DOCUMENTS

| | | | |
|---|---|---|---|
| 2,345,774 | 4/1944 | Simpson | 95/105 |
| 2,910,139 | 10/1959 | Matyear, Jr. | 95/120 X |
| 3,161,488 | 12/1964 | Eastwood et al. | 95/118 X |
| 3,221,476 | 12/1965 | Meyer | 95/122 X |
| 3,237,379 | 3/1966 | Kant et al. | 95/98 |
| 3,359,707 | 12/1967 | Jean | 95/123 |
| 3,594,984 | 7/1971 | Toyama et al. | 95/126 |
| 3,674,429 | 7/1972 | Collins | 95/122 X |
| 3,738,084 | 6/1973 | Simonet et al. | 95/105 |
| 3,841,058 | 10/1974 | Templeman | 95/105 |
| 3,866,428 | 2/1975 | Simonet et al. | 95/121 X |
| 3,967,464 | 7/1976 | Cormier et al. | 95/120 X |
| 4,093,429 | 6/1978 | Siegler et al. | 95/105 |
| 4,233,038 | 1/1980 | Tao | 95/104 |
| 4,249,915 | 2/1981 | Sircar et al. | 55/26 |
| 4,324,564 | 4/1982 | Oliker | 95/123 X |
| 4,373,935 | 2/1983 | Ausikaitis et al. | 95/123 |
| 4,472,178 | 9/1984 | Kumar et al. | 55/25 |
| 4,487,614 | 12/1984 | Yon | 95/124 X |
| 4,541,851 | 9/1985 | Bosquain et al. | 55/208 |
| 4,614,525 | 9/1986 | Reiss | 95/96 |
| 4,627,856 | 12/1986 | von Gemmingen | 95/120 |
| 4,711,645 | 12/1987 | Kumar | 55/26 |
| 4,950,311 | 8/1990 | White, Jr. | 95/98 |
| 5,137,548 | 8/1992 | Grenier et al. | 55/23 |
| 5,447,558 | 9/1995 | Acharya | 95/122 X |
| 5,453,112 | 9/1995 | Sinicropi et al. | 95/106 X |
| 5,486,227 | 1/1996 | Kumar et al. | 95/117 X |

FOREIGN PATENT DOCUMENTS

| | | | |
|---|---|---|---|
| 0612554 | 8/1994 | European Pat. Off. | 95/117 |
| 3045451 | 7/1981 | Germany | 95/96 |
| 3336427 | 4/1985 | Germany | 95/123 |
| 3410815 | 10/1985 | Germany | 95/123 |
| 55-137026 | 10/1980 | Japan | 95/104 |
| 62-001434 | 1/1987 | Japan | 95/123 |
| 5-192528 | 8/1993 | Japan | 95/95 |
| 2181666 | 4/1987 | United Kingdom | 95/120 |
| 2181667 | 4/1987 | United Kingdom | 95/125 |

OTHER PUBLICATIONS

Skarstrom, C.W. "Heatless Fractionation of Gases over Solid Adsorbents", vol. II, 95, N.W. Li(ED) C.R.C. Press, Cleveland, Ohio 1972.
von Gemmingen, U. in "Designs of Adsorptive driers in air separation plants"–Reports on Technology 54/1994 –(Linde).

*Primary Examiner*—Robert Spitzer
*Attorney, Agent, or Firm*—Geoffrey L. Chase

[57] ABSTRACT

A method for the removal from a feed gas stream such as air of at least two contaminating gas components such as water and $CO_2$ features repeated cycles of operation the improvement which comprise: feeding a regenerating gas such as dry nitrogen at a higher temperature, e.g. 70° C., in a direction counter-current to the feed direction in contact with the adsorbent to produce a heat pulse travelling in the counter-current direction to desorb the less strongly adsorbed second contaminating gas component from the downstream (with respect to the feed direction) portion of the adsorbent by TSA while at the same time desorbing the more strongly adsorbed second contaminating gas component from the upstream (with respect to the feed direction) portion of the adsorbent by PSA.

10 Claims, 3 Drawing Sheets

PURIFICATION OF GASES USING SOLID ADSORBENTS

TECHNICAL FIELD OF THE INVENTION

The present invention relates to methods and apparatus for use in removing contaminating gas components from a gas stream by adsorption on a solid adsorbent with periodic regeneration of the adsorbent.

DESCRIPTION OF PRIOR ART

In such methods, the gas stream is fed in contact with a solid adsorbent to adsorb the component to be removed which gradually builds-up in the adsorbent. The concentration of the removed component in the adsorbent will gradually rise. The concentration of the removed gas component in the adsorbent will not be uniform but will be highest at the upstream end of the adsorbent bed and will tail off progressively through a mass transfer zone in the adsorbent. If the process is conducted indefinitely, the mass transfer zone will progressively move downstream in the adsorbent bed until the component which is to be removed breaks through from the downstream end of the bed. Before this occurs, it is necessary to regenerate the adsorbent.

In the pressure swing adsorption PSA system this is done by stopping the flow into the adsorbent of gas to be treated, depressurising the adsorbent and, usually, by passing a flow of a regenerating gas low in its content of the component adsorbed on the bed through the bed counter-current to the product feed direction.

As the component which is being removed is adsorbed while the bed is on-line, the adsorption process will generate heat of adsorption causing a heat pulse to progress downstream through the adsorbent. During the regeneration process, heat must be supplied to desorb the gas component which has been adsorbed on the bed. In PSA, one aims to commence regeneration before the heat pulse mentioned above has reached the downstream end of the bed. The direction of the heat pulse is reversed by the process of regeneration and the heat which derived from the adsorption of the gas component in question is used for desorbing that component during regeneration. One thus avoids having to add heat during the regeneration step.

An alternative procedure is known as temperature swing adsorption (TSA). In TSA, the cycle time is extended and the heat pulse mentioned above is allowed to proceed out of the downstream end of the adsorbent bed during the feed or on-line period. To achieve regeneration it is therefore necessary to supply heat to desorb the adsorbed gas component. To this end the regenerating gas used is heated for a period to produce a heat pulse moving through the bed counter-current to the normal feed direction. This flow of heated regenerating gas is usually followed by a flow of cool regenerating gas which continues the displacement of the heat pulse through the bed toward the upstream end. TSA is characterised by an extended cycle time as compared to PSA.

Each procedure has its own characteristic advantages and disadvantages. TSA is energy intensive because of the need to supply heat to the regenerating gas. The temperatures needed for the regenerating gas are typically sufficiently high, e.g. 150° C. to 200° C., as to place demands on the system engineering which increase costs. Typically, there will be more than one unwanted gas component which is removed in the process and generally one or more of these components will adsorb strongly and another much more weakly. The high temperature used for regenerating in TSA needs to be sufficient for the desorption of the more strongly adsorbed component. Usually, in order to deal with the need to adsorb differing components from the gas stream at the same time, the optimised TSA system will use a dual adsorbent bed containing a first layer for adsorbing the more strongly adsorbed component (e.g. water) and a second layer for adsorbing a more weakly adsorbed component (e.g. carbon dioxide). Thus, for removing water and carbon dioxide from a gas stream, a TSA system will typically use an adsorbent bed having a first layer of alumina for the removal of water and a second layer of 13× molecular sieve for the removal of carbon dioxide and other minor components. To minimise the amount of water which has to be desorbed, it is usual to pre-cool the air to be treated, thus condensing out much of its water content.

Thus, the high temperatures used in a TSA system give rise to a need for the use of insulated vessels, a purge preheater and an inlet end precooler and generally the high temperatures impose a more stringent and costly mechanical specification for the system. In operation, there is extra energy cost associated with using the purge preheater.

Whilst the PSA system avoids many of these disadvantages by avoiding the need for coping with high temperatures, the short cycle time which characterises PSA brings its own disadvantages. In each cycle of operation the adsorbent is subjected to a feed period during which adsorption takes place followed by depressurisation, regeneration and repressurisation. During depressurisation, the feed gas in the bed is vented off and lost. The amount of feed-gas lost in this way is known as the "switch loss". The short cycle time in the PSA system gives rise to high switch losses. Also, because the cycle is short it is necessary that the repressurisation be conducted quickly. In practice, one has two beds of adsorbent undergoing the above cycles of operation with the cycles being phased with respect to one another that there is always one of the two beds in its feed or on-line period. Accordingly, the time available for repressurisation and regeneration is limited by the time the other bed can spend in the feed part of its cycle which is in turn limited by the short cycle time. The rapid depressurisation implied by these constraints causes transient variations in the feed and product flows which can adversely affect the plant operation, particularly the operation of processes downstream from the adsorption system.

PSA is described by Skarstrom, C. W. in "Heatless Fractionation of Gases over Solid Adsorbents", vol. II, 95, N. W. Li (ED) C.R.C. Press, Cleveland, Ohio 1972 and in U.S. Pat. No. 4,711,645 (Kumar).

TSA is described by von Gemmingen, U. in "Designs of Adsorptive driers in air separation plants"—Reports on Technology 54/1994—(Linde) using lower than normal temperatures, i.e. 80° to 130° C. and short cycle times.

A still lower temperature form of TSA is described in U.S. Pat. No. 5,137,548 (Grenier) using a regeneration temperature of 35° C. with a 13× molecular sieve adsorbent. The prior removal of water by cooling the feed air is essential to this process.

U.S. Pat. No. 4,541,851 discloses that one may practise TSA such that the heat pulse is consumed in desorbing both the more strongly and weakly adsorbed components from the adsorbent.

U.S. Pat. Nos. 4,249,915 and 4,472,178 disclose an adsorption process in which moisture and carbon dioxide are removed from atmospheric air by adsorption in separate respective beds. The moisture laden bed is regenerated by pressure swing adsorption in a relatively short operating cycle while the $CO_2$ laden bed is regenerated thermally at considerably longer time intervals. The accomplishment of this naturally necessitates considerably increased apparatus cost in view of the need for separate columns to contain the moisture and carbon dioxide removing beds and additional ancillary equipment. Whilst providing certain benefits, to some extent the teaching of these specifications suffers from the disadvantages of both PSA and TSA. One has the high switch loss and variable output of the PSA water removal module and one also has the high energy demand and equipment cost of the TSA carbon dioxide removal module.

SUMMARY OF THE INVENTION

The present invention now provides a method for the removal from a feed gas stream of at least two contaminating gas components comprising carrying out repeated cycles of operation which cycles comprise:

feeding the feed gas stream in a feed direction at first pressure and at a first temperature in contact with a solid adsorbent capable of adsorbing a first of said contaminating gas components more strongly and a second of said gas components less strongly so that said first component is adsorbed in an upstream portion of said adsorbent and said second contaminating gas component is adsorbed principally in a more downstream portion of said adsorbent, halting the feeding of said feed gas stream, depressurising the gas in contact with the adsorbent to a second, lower pressure, feeding a regenerating gas at said second pressure and at a second temperature higher than said first temperature in a direction counter-current to said feed direction in contact with said adsorbent to produce a heat pulse travelling in said counter-current direction to desorb said less strongly adsorbed second contaminating gas component from the downstream (with respect to the feed direction) portion of the adsorbent by temperature swing adsorption (TSA) whilst at the same time desorbing the more strongly adsorbed contaminating gas component from the upstream (with respect to the feed direction) portion of the adsorbent by pressure swing adsorption (PSA), ceasing said flow of regenerating gas before the heat pulse travels as far as the upstream portion of the adsorbent in which is adsorbed the first contaminating gas component, and repressurising said adsorbent.

The invention therefore combines TSA and PSA into a new single system of operation which may conveniently be referred to as TEPSA. Although the invention will be described here-after principally in terms of the removal of water and carbon dioxide from air as a necessary prelude to the separation of air into oxygen and nitrogen in a cryogenic air separation unit, it will be appreciated that the invention is applicable to essentially any situation in which a gas stream contains a first contaminating component which will adsorb strongly on a solid adsorbent and a second contaminating component which will adsorb significantly less strongly, which will generally result in the first contaminating component adsorbing in an upstream portion of the adsorbent and the second contaminating component adsorbing in a downstream portion as well possibly as adsorbing to some extent in the upstream portion.

In a preferred method of operating the invention, especially in connection with the removal of carbon dioxide and water from air, the first temperature referred to above is 10° to 50° C., e.g. 10° to 30° C.

As indicated above, it would be conventional practice in operating a TSA system to remove water and carbon dioxide from air for the regenerating gas to be at the temperature of 150° to 200° C. in order to get a sufficient heat pulse through at least the bulk of the adsorbent within the half of the overall cycle time (less depressurisation time) available. In accordance with the present invention, the heat pulse is not driven as far through the adsorbent as the portion containing the more strongly adsorbed component. The heat pulse may stop anywhere within the more downstream portions of the adsorbent containing the more weakly adsorbed component depending on the operating conditions. The heat pulse does not have to reach the boundary between the two portions of the adsorbent.

As one is not seeking to desorb the more strongly adsorbed component by TSA one does not need to use such a high temperature regenerating gas in order to obtain sufficient heat input at a suitable regenerating gas flow rate. Therefore, according to the present invention it is preferred to employ a substantially lower temperature for the regeneration gas so that sufficient heating may be obtained by using waste heat which is readily available. Thus, the said second temperature is preferably from 40° to 100° C., more preferably from 40° to 60° C., e.g. about 50° C. The regenerating gas may be heated to such temperatures conveniently by heat exchange with heat generated in the main gas compressors which are used to compress the feed air stream.

The flow of regenerating gas may be at such a temperature throughout the regeneration period or, optionally, the flow of regenerating gas may be at such a temperature during a first part of the regeneration period and the temperature may then be reduced to a lower temperature, typically very similar to the temperature of the feed gas stream, for a further period of regeneration. In either case, a heat pulse produced by the heated regenerating gas will be progressively displaced through the adsorbent from the downstream end toward the upstream end within the portion of the adsorbent in which the less strongly adsorbed, second, contaminating gas component (such as carbon dioxide) is adsorbed. According to the method of the invention, regeneration ceases before that heat pulse has penetrated into the first portion of the adsorbent bed containing the more strongly adsorbed contaminating gas component (such as water).

As compared to a PSA system, one does not need to seek to confine the heat generated by adsorption within the bed, as heat is replaced in the bed from the heated regenerating gas. This enables the cycle time to be extended and switch losses to be reduced. Also, because the less strongly bound contaminating gas component is more effectively removed from the downstream portion of the bed using the heated regenerating gas than it would be by PSA conducted without heating the regenerating gas at all, the effective regenerable capacity of the adsorbent for the less strongly adsorbed contaminating gas component is increased and the cycle time may be extended without break-through of the contaminating gas component from the bed.

Sufficient of the heat of adsorption from the on-line cycle will remain in the bed to allow desorption of the more strongly bound component by PSA. Typically, there will be a drop in the temperature of the adsorbent in the stronger adsorption zone due to a net heat loss, but this will not be sufficient to prevent successful PSA regeneration.

Benefits of extending the cycle time are a decrease in switch loss and the possibility of having more time available within which to conduct repressurisation at a more gradual rate, thereby reducing the variation in the output of purified gas with benefit to downstream processes. Alternatively, one can derive the benefit of the increase in the effective capacity of the adsorbent by using a lesser volume of adsorbent.

In order to counter temperature fluctuations in the feed gas freed from contaminating components produced according to the method of the invention, it is preferred that the said purified feed gas is cooled before being supplied for further processes. Such cooling may be carried out by feeding the purified gas stream in heat exchange with the regenerating gas as a first stage in warming the regenerating gas.

The invention also provides apparatus for the removal from a feed gas stream of at least two contaminating gas components comprising:

solid adsorbent capable of adsorbing a first of said contaminating components more strongly and a second of said contaminating gas components less strongly, a vessel containing said solid adsorbent for gas flow in contact therewith, an inlet to said vessel for feeding the feed gas stream in a feed direction in contact with said solid adsorbent and an outlet from said vessel for said feed gas, valve means for starting and for halting the feeding of said gas stream, valve means for depressurising the gas in contact with the adsorbent to a second, lower pressure, an inlet to said vessel for feeding a regenerating gas in a direction counter-current to said feed direction in contact with said adsorbent, an outlet from said vessel for said regenerating gas, valve means for starting and halting the flow of regenerating gas, means for heating said regenerating gas, and means for controlling the operation of the said valve means and said heating means so as to carry out repeating cycles of operation comprising:

feeding the feed gas in contact with the adsorbent stream in a feed direction at a first pressure and at a first temperature in contact with said solid adsorbent so that said first contaminating gas component is adsorbed in an upstream portion of said adsorbent and said second contaminating gas component is adsorbed principally in a more downstream portion of the adsorbent, halting the feeding of said gas stream, depressurising the gas in contact with the adsorbent to a second, lower pressure, feeding a regenerating gas at said second pressure and at a second temperature higher than said first temperature in a direction counter-current to said feed direction in contact with said adsorbent to produce a heat pulse travelling in said counter-current direction to desorb said less strongly adsorbed second contaminating gas component from the downstream (with respect to the feed direction) portion of the bed by TSA whilst at the same time desorbing the more strongly adsorbed first contaminating gas component from the upstream (with respect to the feed direction) portion of the adsorbent by PSA, and ceasing said flow of regenerating gas before the heat pulse travels as far as the upstream portion of the adsorbent in which is adsorbed the first contaminating gas component.

Preferably, said control means operates to cease the heating of the regenerating gas before the flow of regenerating gas is halted so that there is a period in which the flow of regenerating gas continues unheated.

Said apparatus may further comprise compressor means compressing said feed gas and thereby producing heat, and said means for heating the regenerating gas may comprise heat exchange means for heating said regenerating gas with the heat produced by compression of the feed gas.

The apparatus may further comprise means for cooling the feed gas stream after removal of said contaminating gas components which as indicated above may be heat exchange means for transferring heat from said heat gas to said regenerating gas.

DETAILED DESCRIPTION OF THE INVENTION

Preferred features and practice of the invention will be described below with reference to the accompanying drawings illustrating non-limiting examples of the invention.

Figure 1:
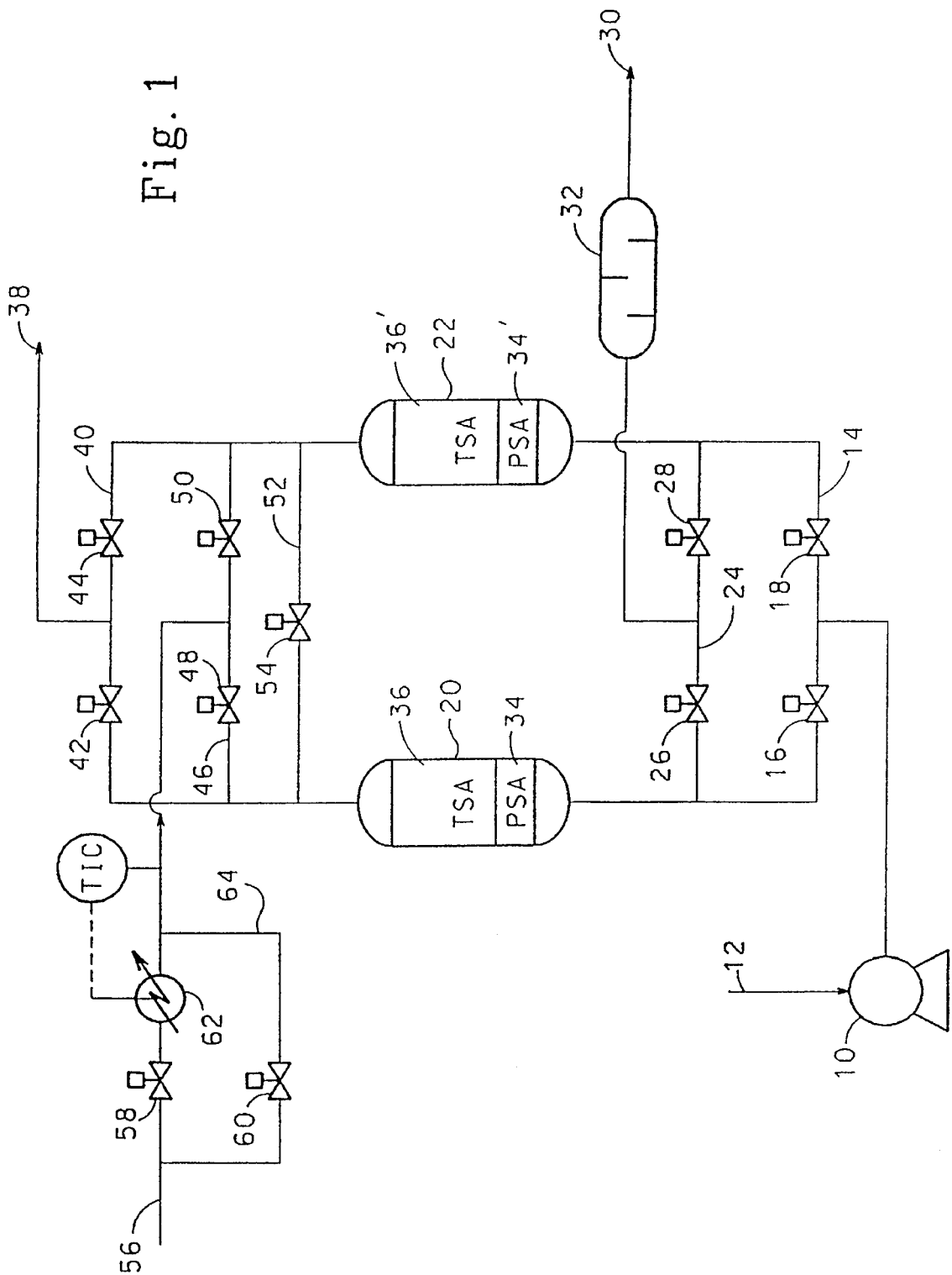
FIG. 1 schematically illustrates apparatus for use according to a first embodiment of the invention.
Figure 2:
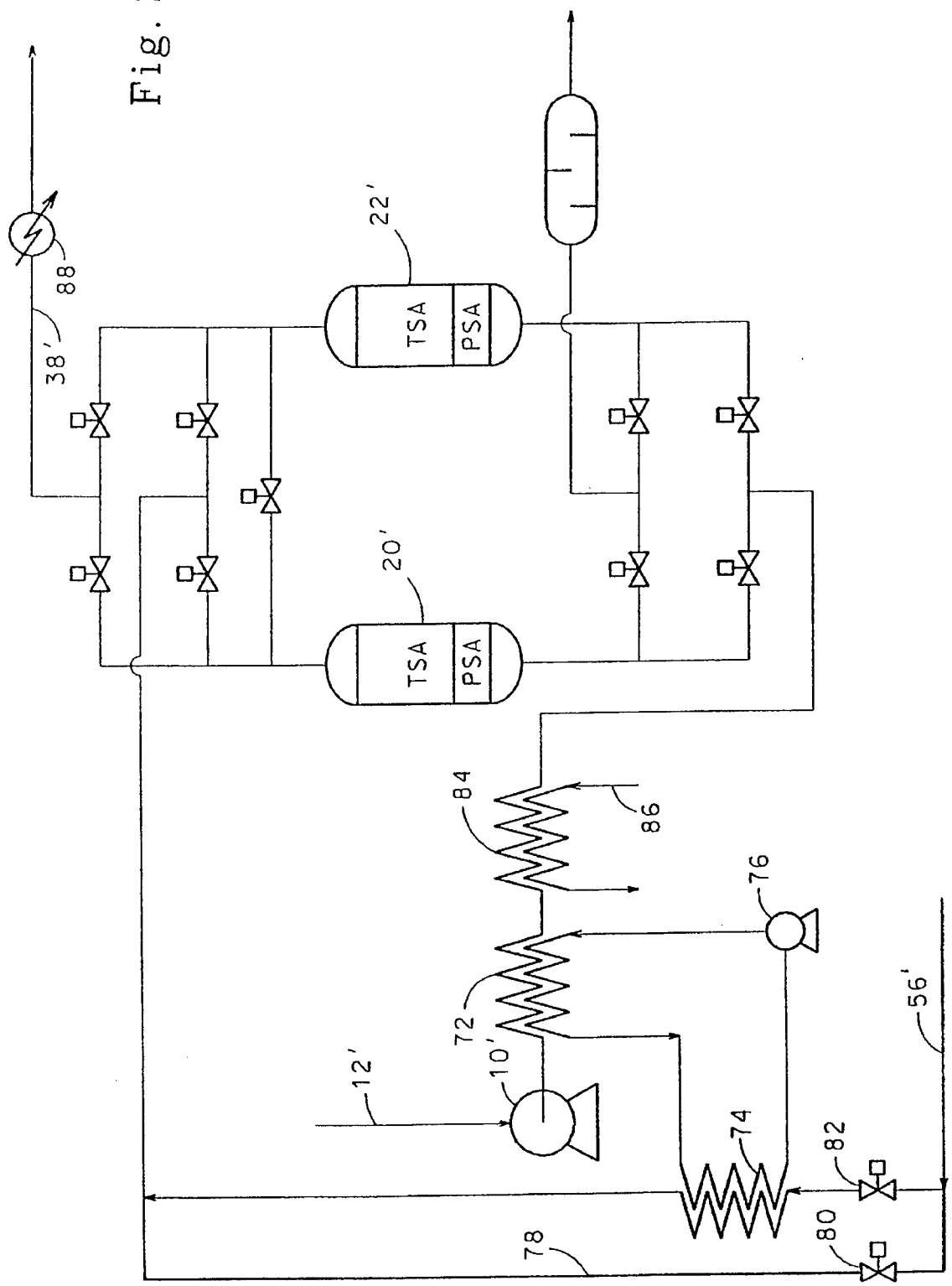
FIG. 2 schematically illustrates apparatus for use in accordance with a second embodiment of the invention.

FIGS. 1 and 2 each show apparatus for removing carbon dioxide and water from air which is to be passed to a known form of cryogenic air separation unit (not shown) which provides separated oxygen and nitrogen, the latter being in part used as regenerating gas in the illustrated air purification apparatus.

As shown in FIG. 1, air to be purified is supplied to a main air compressor system 10 at an inlet 12 in which it is compressed by a multi-stage compressor with inter and after cooling by heat exchange with water. The cooled compressed air is supplied to an inlet manifold 14 containing inlet control valves 16 and 18 to which is connected a pair of adsorbent bed containing vessels 20 and 22. The inlet manifold is bridged downstream of the control valves 16 and 18 by a venting manifold 24 containing venting valves 26, 28 which serve to close and open connections between the upstream end of respective adsorbent vessels 20 and 22 and a vent 30 via a silencer 32. Each of the two adsorbent beds 20 and 22 contains a single adsorbent. A lower portion of the adsorbent is designated by the numeral 34, 34' in respective beds and upper portion by the numeral 36, 36' to aid further discussion but it should be understood that there is no fixed boundary between these two regions.

The apparatus has an outlet 38 connected to the downstream ends of the two adsorbent vessels 20, 22 by an outlet manifold 40 containing outlet control valves 42, 44. The outlet manifold 40 is bridged by a regenerating gas manifold 46 containing regenerating gas control valves 48 and 50. Upstream from the regenerating gas manifold 46, a line 52 containing a control valve 54 also bridges across the outlet manifold 40.

An inlet for regenerating gas is provided at 56 which through control valves 58 and 60 is connected to pass either through a heater 62 or via a by-pass line 64 to the regenerating gas manifold 46.

The operation of the valves may be controlled by suitable programmable timing and valve operating means as known in the art, not illustrated.

In operation air is compressed in the main air compressor system 10 and is fed to the inlet manifold 14 and passes through one of the two vessels containing adsorbent. Starting from a position in which air is passing through open valve 16 to adsorbent vessel 20, and through open valve 42 to the outlet 38, valve 18 in the inlet manifold will just have been closed to cut-off vessel 22 from the feed of air for purification. Valve 44 will just have closed also. At this stage valves 48, 50, 54, and 26 are closed. Bed 20 is thus on-line and bed 22 is to be regenerated.

To commence depressurisation of bed 22, valve 28 is opened and once the pressure in the vessel 22 has fallen to a desired level, valve 28 is kept open whilst valve 50 is opened to commence a flow of regenerating gas. The regenerating gas will typically be a flow of dry, $CO_2$-free nitrogen obtained from the air separation unit cold box, possibly containing small amounts of argon, oxygen and other gases, to which the air purified in the apparatus shown is passed. Valve 60 is closed and valve 58 is opened so that the regenerating gas is heated to a temperature of for instance 70° C. before passing into the vessel 22. Although the regenerating gas enters the vessel 22 at the selected elevated temperature, it is very slightly cooled by giving up heat to desorb carbon dioxide from the upper, downstream portion 36' of the adsorbent in the vessel. Since the heat pulse is retained in the system, the exit purge gas emerges from the vent outlet 30 in a cooled state. Progressively, a heat wave moves through the portion 36' of the adsorbent as the carbon dioxide is cleared. After a desired period, whilst the heat pulse is part way through the portion 36', valve 58 is closed and valve 60 is opened so that the flow of regenerating gas now becomes cool. The cooled regenerating gas displaces the heat pulse further through the portion 36' of the adsorbent.

Whilst the upper portion of the adsorbent has been thus regenerated by TSA, the cool regenerating gas has continued to flow through the lower portion of the adsorbent and by virtue of its reduced pressure has desorbed water from the upstream portion of the adsorbent by PSA. At the end of the allotted regeneration period, valve 50 may be closed to end the flow of regenerating gas and valve 54 may be opened to displace nitrogen from the adsorbent and, after the closing of valve 28, to repressurise the vessel 22 with purified air. Thereafter, valve 54 may be closed and valves 18 and 44 may be opened to put the vessel 22 back on line. Residual heat left in bed may be removed by purified air as a temperature pulse which can be removed in a downstream heat exchanger. The vessel 20 may then be regenerated in a similar manner and the whole sequence continued with the vessels being on-line, depressurising, regenerating, repressurising, and going back on-line in phased cycles of operation.

In accordance with the invention, the heat pulse during regeneration does not penetrate as far as the boundary of the portion of the adsorbent into which water is adsorbed. This will lie somewhere within the region 34, 34' below the boundary with the region 36, 36' shown in the drawings. The actual proportions of the regions 34, 34' and 36, 36' are dependent on the operating conditions, e.g. feed pressure, feed temperature, cycle time and purge/air ratio.

In the variant of the apparatus shown in FIG. 2, the regenerating gas is heated by heat exchange with a closed loop water recirculation system.

Air 12' compressed in the main air compressor system 10', which is at a high temperature due to the compression is precooled before being introduced into the TEPSA beds 20', 22'. Heat is recovered from the compressed air therefor in a two stage after cooler comprising a first stage cooler 72 in which the compressed air is cooled with cooling water, which in turn is heat exchanged with purge nitrogen 56' from the air separation plant in a heat exchanger 74. Heat exchangers 72 and 74 form a closed water recirculation system with a water pump 76. A by-pass line 78 is provided for the purge gas around the heat exchanger 74 and flow through the line 78 and the heat exchanger 74 is controlled by valves 80 and 82 respectively. Any excess heat remaining in the compressed feed air may be removed in a second stage cooler 84 of the two stage after cooler 72, 84 to which is provided a flow of cooling water 86.

The purified air at outlet 38' is cooled by cooling water in a heat exchanger 88.

The adsorbent used in the apparatus and method described above may be of several kinds. Each of the adsorbent vessels may contain a single type of adsorbent as indicated above or may contain more than one type of adsorbent. Thus one may employ a layered bed containing an upstream layer of alumina followed by a downstream layer of molecular sieve. More preferably however one employs an all alumina adsorbent which either all of one type or arranged in layers of different types. Thus for instance the adsorbent may all be activated alumina or silica alumina as known in the art. Alternatively, it may be an enhanced alumina of the type which may be produced by adsorbing approximately 5% by weight potassium carbonate on to alumina by treating the starting alumina with a potassium carbonate solution and drying at temperatures of up to about 125° C. Such aluminas have a particularly high capacity for carbon dioxide and may be used by themselves or as the upper layer in a two layer bed.

It should be understood of course that the vessels 20, 20' and 22, 22' can each if desired be separated into smaller vessels arranged in series and references to "layers" of adsorbent above include arrangements in which the separate adsorbents are placed in separate vessels arranged in series.

Preferred operating parameters for methods using the illustrated apparatus are set out below in Table 1.

TABLE 1

|  | Units | Preferred Range | Most Preferred Range |
| --- | --- | --- | --- |
| Air Feed Pressure | bara | 3 to 25 | 5 to 10 |
| Air Feed Temperature | °C. | 10 to 50 | 10 to 30 |
| Purge Normal Temperature | °C. | 10 to 50 | 10 to 30 |
| Purge Heat Pulse | °C. | 40 to 100 | 40 to 60 |
| On-line | min | 15 to 120 | 30 to 45 |
| Purge Heated Duration | min | 5 to Total | 10 to 15 |
| Molar Purge/Air Ratio | — | 0.2 to 0.8 | 0.3 to 0.5 |
| Feed $CO_2$ Conc | ppm | 100 to 700 | 300 to 500 |
| Purge Pressure | bara | 0.3 to 3 | 1.05 to 1.3 |

The following examples compare PSA and TEPSA systems with the duration of the operations making up each cycle of operation being optimised for the PSA or TEPSA system as appropriate.

EXAMPLE 1

Apparatus as shown in FIG. 2 is operated according to the following parameters:

Air pressure=6 bara, Purge Pressure=1.1 bara, Molar Purge/Air ratio=0.45, Adsorbent bead size=1.2–2.4 mm, Air Feed Temp=30° C., Max Purge Temp=70° C., Adsorbent type=activated alumina.

The switch loss and capacity for PSA and TEPSA systems are found to be as shown in Table 2 below.

TABLE 2

| Adsorber Type | On-line min | Hot Purge min | Cold Purge min | Repressurise min | Switch Loss % of Feed | Capacity kg air/ kg ads/hr | Bed Composition |
|---|---|---|---|---|---|---|---|
| Optimum PSA | 14 | — | 12 | 2 | 0.9 | 3.1 | Alumina |
| TEPSA | 30 | 10 | 16 | 4 | 0.4 | 4.6 | $K_2CO_3$ Alumina |
| TEPSA | 30 | 10 | 16 | 4 | 0.4 | 3.1 | Alumina |

It will be noted that the switch loss is reduced by half and that the TEPSA system allows the repressurisation period to be doubled in length, so reducing fluctuations in the output of purified air by allowing purified air to be abstracted from the on-line bed at a lesser rate to achieve repressurisation of the second bed.

EXAMPLE 2

TEPSA is conducted using the apparatus of FIG. 2 according to the following parameters:

Air pressure=10 bara, Purge Pressure=1.1 bara, Molar Purge/Air ratio=0.3, Adsorbent bead size=1.2–2.4 mm, Air Feed Temp=30° C., Max Purge Temp=70° C., Adsorbent=activated alumina.

The switch loss and capacity are found to be as shown in Table 3 below.

TABLE 3

| Adsorber Type | On-line min | Hot Purge min | Cold Purge min | Repressurise min | Switch Loss % of Feed | Capacity kg air/ kg ads/hr | Bed Composition |
|---|---|---|---|---|---|---|---|
| Optimum PSA | 14 | — | 12 | 2 | 1.4 | 2.8 | Alumina |
| TEPSA | 30 | 10 | 16 | 4 | 0.5 | 3.1 | $K_2CO_3$ Alumina |
| TEPSA | 30 | 10 | 16 | 4 | 0.6 | 2.8 | Alumina |

Figure 3:
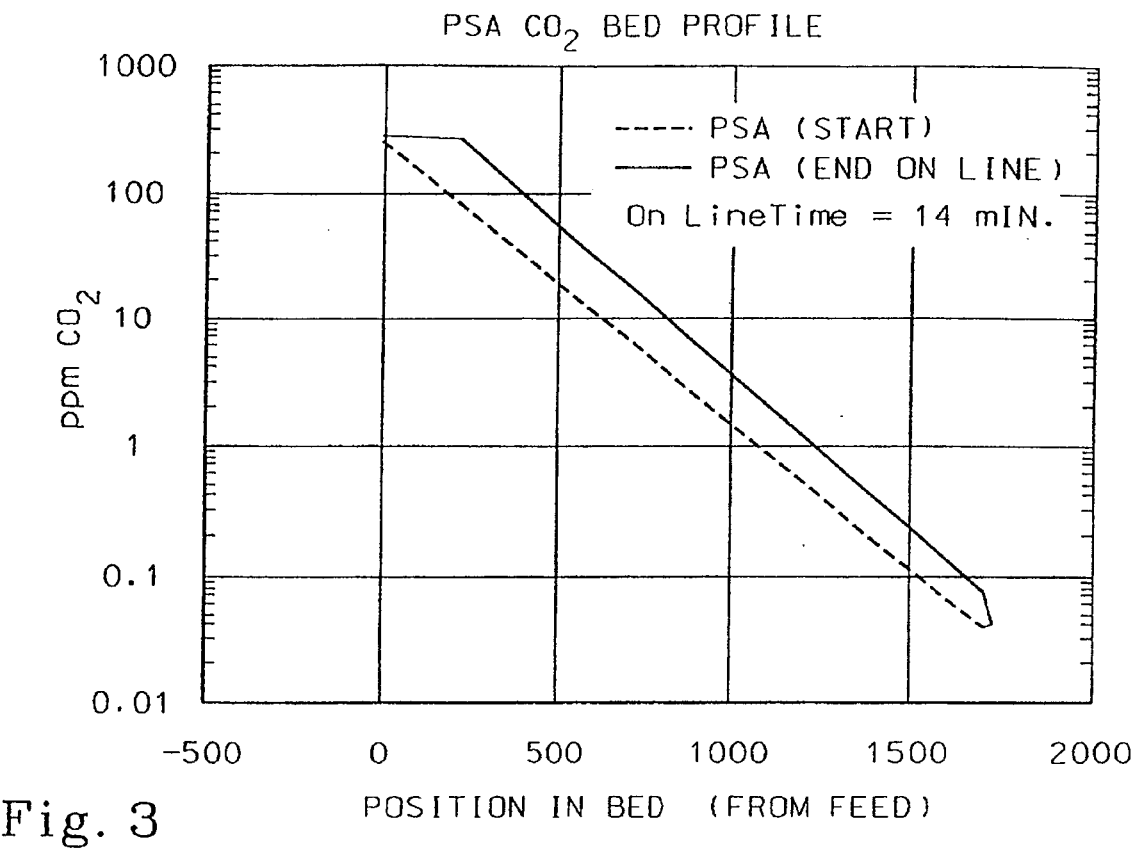
FIG. 3 is a graph showing the $CO_2$ concentration distribution through an adsorbent bed under PSA regeneration conditions, as calculated by computer simulation.
Figure 4:
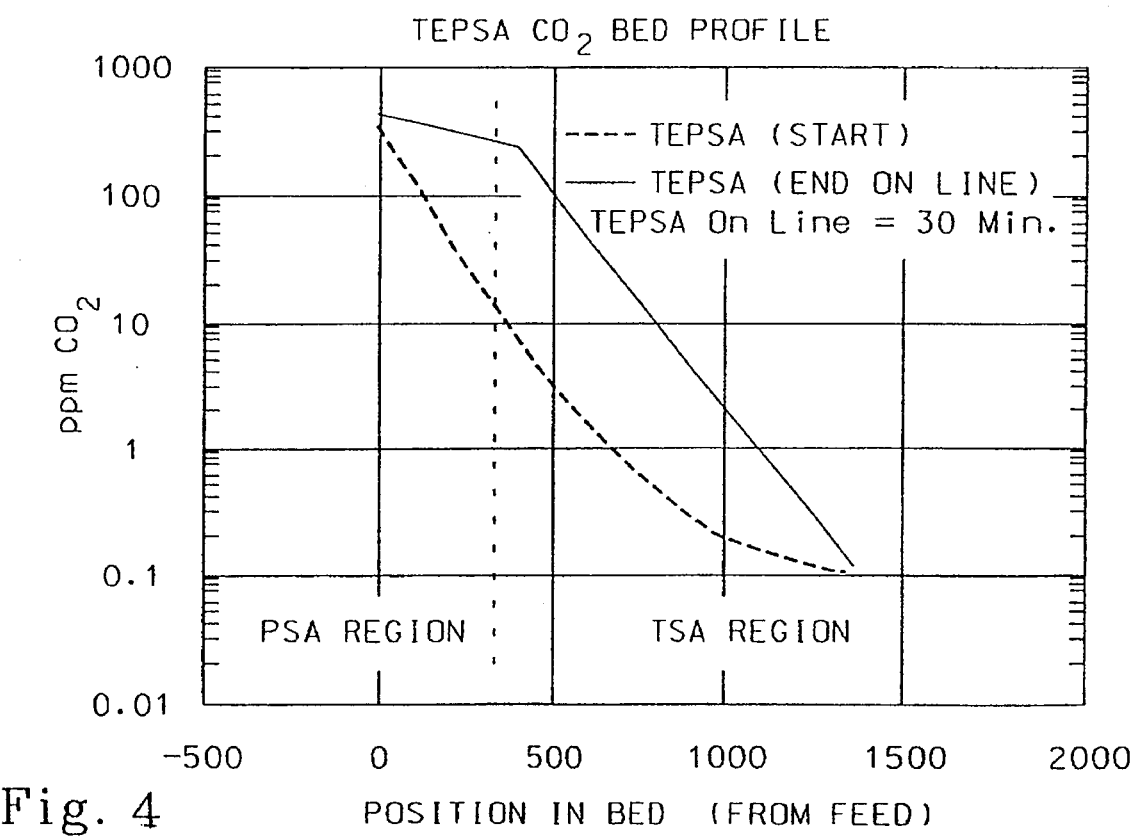
FIG. 4 is a similar computer simulation output in respect of TEPSA regeneration conditions.

The benefits of TEPSA are graphically shown by FIGS. 3 and 4. In a PSA regime, the $CO_2$ concentrations along an adsorbent bed at the end of an on-line period and at the end of regeneration are shown in FIG. 3. PSA takes place within the zone within the envelope over an on-line period of 14 minutes.

In TEPSA as shown in FIG. 4, the on-line period can be extended to 30 minutes because the regeneration knocks back the $CO_2$ concentration curve much more effectively than PSA regeneration giving a much larger operating zone.

Comparing the positions at the end of the 14 minute on-line period using PSA and the 30 minute on-line period using PSA and the 30 minute on-line period using TEPSA, it can be seen that the curve is much steeper using TEPSA with the tail of the curve being further from the outlet end of the bed, despite the longer cycle time used.

It should be appreciated that many modifications and variations are possible within the scope of the invention.

In particular, more than two adsorbent feeds may be used. The more weakly adsorbed component may be or may include gases other than $CO_2$, e.g. hydrocarbons.

We claim:

1. A method for the removal from a feed gas stream of at least two contaminating gas components comprising carrying out repeated cycles of operation which comprise:

feeding the feed gas stream in a feed direction at a first pressure and at a first temperature in contact with a solid adsorbent capable of adsorbing a first of said contaminating gas components more strongly and a second of said contaminating gas components less strongly so that said first contaminating gas component is adsorbed in an upstream portion of said adsorbent and said second contaminating gas component is adsorbed principally in a more downstream portion of said adsorbent, halting the feeding of said feed gas stream, depressurising the gas in contact with the adsorbent to a second, lower pressure, feeding a regenerating gas at said second pressure and at a second temperature higher than said first temperature in a direction counter-current to said feed direction in contact with said adsorbent to produce a heat pulse travelling in said counter-current direction to desorb said less strongly adsorbed second contaminating gas component from the downstream (with respect to the feed direction) portion of the adsorbent by TSA whilst at the same time desorbing the more strongly adsorbed first contaminating gas component from the upstream (with respect to the feed direction) portion of the adsorbent by PSA, ceasing regenerating gas before the heat pulse travels as far as the upstream portion of the adsorbent in which is adsorbed the first contaminating gas component, and repressurising said adsorbent.

2. A method as claimed in claim 1, wherein the first, more strongly adsorbed, gas component is water and the second, less strongly adsorbed gas component is carbon dioxide.

3. A method as claimed in claim 1, wherein the second temperature is from 40° to 100° C.

4. A method as claimed in claim 1, wherein the second temperature is from 40° to 60° C.

5. A method as claimed in claim 1, wherein after the feeding of the regenerating gas at said second temperature for a first period, the regenerating gas is fed for a second period at a temperature lower than said second temperature to displace said heat pulse upstream (with respect to the feed direction).

6. A method as claimed in claim 5, wherein said temperature lower than said second temperature is substantially equal to said first temperature.

7. A method as claimed in claim 1, wherein said first temperature is from 10° to 50° C.

8. A method as claimed in claim 7, wherein said first temperature is 10° to 30° C.

9. A method as claimed in claim 1, wherein the feed gas stream is compressed to said first pressure producing heat which is used to warm said regenerating gas to said second temperature.

10. A method as claimed in claim 1, wherein the feed gas stream after leaving the adsorbent is heat exchanged against cooling water to produce a constant final delivery temperature.

* * * * *

UNITED STATES PATENT AND TRADEMARK OFFICE
CERTIFICATE OF CORRECTION

PATENT NO. : 5,614,000
DATED : Mar. 25, 1997
INVENTOR(S) : Kalbassi, et al.

It is certified that error appears in the above-indentified patent and that said Letters Patent is hereby corrected as shown below:

Column 10, line 59, between "ceasing" and "regenerating" insert -- feeding said --.

Signed and Sealed this

Twenty-sixth Day of August, 1997

*Attest:*

BRUCE LEHMAN

*Attesting Officer*  *Commissioner of Patents and Trademarks*